US012568408B2

(12) United States Patent
  Nishimaki et al.

(10) Patent No.:  US 12,568,408 B2
(45) Date of Patent:  Mar. 3, 2026

(54) COMMUNICATION SYSTEM, BASE STATION, MOBILE STATION, MANAGEMENT APPARATUS, HANDOVER CONTROL METHOD, AND PROGRAM

(71) Applicant: SoftBank Corp., Tokyo (JP)

(72) Inventors: Takuya Nishimaki, Tokyo (JP); Sho Nabatame, Tokyo (JP); Mitsukuni Konishi, Tokyo (JP)

(73) Assignee: SoftBank Corp., Tokyo (JP)

( * ) Notice: Subject to any disclaimer, the term of this patent is extended or adjusted under 35 U.S.C. 154(b) by 563 days.

(21) Appl. No.: 18/018,284

(22) PCT Filed: Jul. 28, 2021

(86) PCT No.: PCT/JP2021/027838
  § 371 (c)(1),
  (2) Date: Oct. 24, 2023

(87) PCT Pub. No.: WO2022/030321
  PCT Pub. Date: Feb. 10, 2022

(65) Prior Publication Data
  US 2024/0259889 A1  Aug. 1, 2024

(30) Foreign Application Priority Data
  Aug. 5, 2020  (JP) ................................. 2020-133287

(51) Int. Cl.
  *H04W 36/00*  (2009.01)
  *H04W 36/30*  (2009.01)
(52) U.S. Cl.
  CPC ... *H04W 36/0058* (2018.08); *H04W 36/0061* (2013.01); *H04W 36/0072* (2013.01); *H04W 36/302* (2023.05); *H04W 36/304* (2023.05)

(58) Field of Classification Search
  CPC ......... H04W 36/0085; H04W 36/0094; H04W 36/06; H04W 36/00837; H04W 36/00;
  (Continued)

(56) References Cited

U.S. PATENT DOCUMENTS 9,713,024 B2 * 7/2017 Liang .................... H04W 24/10
10,251,112 B2  4/2019 Fujishiro et al.
  (Continued)

FOREIGN PATENT DOCUMENTS

CN  106851680 A * 6/2017 ............ H04W 24/02
JP  2020-047976 A  3/2020
  (Continued)

OTHER PUBLICATIONS

3GPP, "Universal Mobile Telecommunications System (UMTS); Radio Resource Control (RRC); Protocol specification," 3GPP TS 25.331 version 16.0.0 Release 16, ETSI TS 125 331 V16.0.0, Nov. 2020.
  (Continued)

*Primary Examiner* — Dung Hong
(74) *Attorney, Agent, or Firm* — Westborough IP Group, LLC

(57) ABSTRACT

In an overlay cell configuration in which a second cell, a second cell of a same frequency and a third cell of a different frequency are overlapped at least partially with each other, a concentration of communication traffic on the first cell is prevented. It is obtained of a measurement result (MR) including a measurement result of a reception-quality level measured at the same frequency reported by a mobile station connected to a second base station of the same frequency and a cell identifier of a receiving target cell, it is decided whether to change a value of a parameter for determination used for determining a different-frequency-measurement start that is set in the second base station of the same
  (Continued)

frequency, based on the measured value of the reception-quality level of the signal from the first cell included in the measurement report (MR), when the measurement report (MR) includes the cell identifier of the first cell, and the value of the parameter for determination is changed based on a result of the deciding.

20 Claims, 8 Drawing Sheets

(58) Field of Classification Search
CPC .............. H04W 36/24; H04W 36/144; H04W 36/0088; H04W 36/0061
See application file for complete search history.

(56) References Cited

U.S. PATENT DOCUMENTS

| | | | | | |
|---|---|---|---|---|---|
| 10,869,240 | B2 * | 12/2020 | Liu | ........................ | H04W 36/22 |
| 2012/0220302 | A1 * | 8/2012 | Ebara | ................ | H04W 36/0085 |
| | | | | | 455/437 |

| | | | | | |
|---|---|---|---|---|---|
| 2016/0198386 | A1 * | 7/2016 | Vangala | .......... | H04W 36/00837 |
| | | | | | 455/436 |
| 2018/0132145 | A1 | 5/2018 | Cao et al. | | |
| 2019/0223064 | A1 * | 7/2019 | Tamura | ............. | H04W 36/0058 |
| 2020/0015107 | A1 * | 1/2020 | Takahashi | ......... | H04W 36/0058 |
| 2020/0059836 | A1 * | 2/2020 | Isokangas | ......... | H04W 36/0058 |
| 2022/0078686 | A1 * | 3/2022 | Yiu | ........................ | H04W 36/00 |

FOREIGN PATENT DOCUMENTS

| | | | | | |
|---|---|---|---|---|---|
| WO | WO 2016/163546 | A1 | 10/2016 | | |
| WO | WO-2019237839 | A1 * | 12/2019 | ............ | H04W 24/02 |

OTHER PUBLICATIONS

European Search Report, Dated Jul. 25, 2024.

* cited by examiner

COMMUNICATION SYSTEM, BASE STATION, MOBILE STATION, MANAGEMENT APPARATUS, HANDOVER CONTROL METHOD, AND PROGRAM

TECHNICAL FIELD

The present invention relates to a communication system, a base station, a mobile station, a management apparatus, a handover control method and a program in an overlay cell configuration.

BACKGROUND ART

In recent years, as a countermeasure against disasters and an elimination of out-of-service areas, it has been considered effective to deploy a three-dimensional large zone cell (first cell) that is formed from a movable base station in an upper airspace incorporated in a flying object such as an aircraft, an artificial satellite, a HAPS, a balloon, a helicopter or a drone toward on the ground, on the water or a low altitude airspace. In an overlay cell configuration in which terrestrial cells (second cells) such as normal macro cells and small cells are superimposed in this large zone cell, a frequency utilization efficiency can be enhanced by operating the large zone cell using the same frequency as the terrestrial cell.

In the overlay cell configuration, since the large zone cell, in which the same frequency is used in a downlink of a service link, is deployed in an upper airspace above the terrestrial cell, not only UEs located in the area outside the terrestrial cell area in the large zone cell connect to the large zone cell, but also UEs (for example, UEs located in cell boundaries between terrestrial cells or outdoors) in an environment, in which the signal of the large zone cell is strong, hand over to the large zone cell, so that a large number of UEs may be located in the large zone cell and the communication traffic may be concentrated on the large zone cell. Moreover, a communication capacity per unit area of the large zone cell is smaller than that of the terrestrial cell. If the communication traffic is concentrated on such a large zone cell with a small capacity, it is deteriorated of communication quality of UEs that really need to connect to the large zone cell (for example, UEs located in out-of-service areas of conventional terrestrial cells such as mountainous areas, rural areas away from urban areas, the sea, the center of large lakes, and the upper airspace, or out-of-service areas in the event of a disaster).

In the conventional handover between cells, when a UE connected to the terrestrial cell constantly searches for the frequency same as the frequency of the terrestrial cell being connected (hereinafter, also referred to as "same frequency") and a level of reception quality (hereinafter, also referred to as "reception level") from the connecting base station of the terrestrial cell being connected becomes less than a predetermined threshold value, the UE begins to periodically transmit a measurement report (MR) including the reception level and a PCI (physical cell identifier) of each of the terrestrial cell being connected and another cell found in the search of the same frequency, to the connected base station. In case that the measurement report (MR) received from the UE includes the reception level and the PCI of the base station of the other cell of the same frequency found in the search of the same frequency, the connected base station causes the UE to perform a handover to the base station of the other cell. On the other hand, in case that the same frequency search does not find a base station of another cell with the same frequency and the measurement report (MR)

from the UE does not include the reception level and a PCI of the base station in another cell with the same frequency, when the reception level from the connected base station falls below a predetermined threshold (fixed value), the connected base station of the terrestrial cell, to which the UE is connected, causes the UE to search for a frequency different from the frequency of the connected cell (hereinafter, also referred to as "different frequency"), and causes the UE to perform a handover to the base station of the cell of the different frequency (see, for example, Non-Patent Literature 1).

CITATION LIST

Non-Patent Literature

Non-Patent Literature 1: 3GPP TS 25.331 V 16.0.0 (2020-03)

SUMMARY OF INVENTION

Technical Problem

However, if the technique of handover between different frequencies in Non-Patent Literature 1 is applied to the above-described overlay cell configuration, there is a following problem. In case that the same frequency is used in the connected base station of the terrestrial cell, to which the UE is connected, and the base station of the large zone cell, if the reception level from the base station of the large zone cell is high in the area where the reception level from the connected base station is low, before the reception level from the connected base station of the terrestrial cell reaches the foregoing predetermined threshold value (fixed value) for starting the search of different frequency, it occurs of the handover from the connected base station on the ground to the base station of the large zone cell of the same frequency. Due to this occurrence of the handover to the base station of the large zone cell, there is a problem that it is not possible to perform a handover to the base station of the terrestrial cell with the different frequency and to prevent the concentration of communication traffic to the large zone cell.

Solution to Problem

A communication system according to an aspect of the present invention is a communication system of an overlay cell configuration, which comprises one or more first base stations for forming one or more first cells, one or more second base stations for forming a second cell of a same frequency using a same downlink frequency as the first cell, and one or more third base stations for forming a third cell of a different frequency using a downlink frequency different from that of the first cell, wherein the first cell, the second cell and the third cell are overlapped with each other at least partially. This communication system comprises means for deciding whether to change a value of a parameter for determination used for determining a different-frequency-measurement start, when a cell identifier of the first cell is included in a measurement report (MR) that is reported by a mobile station connected to the second cell of the same frequency and includes a measurement result of a reception-quality level measured at the same frequency and a cell identifier of a receiving target cell, based on a measured value of a reception-quality level of a signal from the first cell included in the measurement report (MR) that is reported by a mobile station connected to the second cell of the same frequency and includes a measurement result of a reception-quality level measured at the same frequency and a cell identifier of a receiving target cell, when a cell identifier of the first cell is included in the measurement report (MR), and means for changing a value of the parameter for determination based on a result of the deciding.

In the foregoing communication system, when the measurement result of the reception-quality level from the first base station reported in the measurement report (MR) from the mobile station is larger than a threshold value of different-frequency-measurement start of the second cell under connecting to which the mobile station is connected, a determination to change the value of the parameter for determination may be performed.

In the foregoing communication system, the second base station of the same frequency may comprise means for receiving the measurement report (MR) including the measurement result of the reception-quality level measured at the same frequency and the cell identifier of the receiving target cell from a mobile station connected to the own second base station, means for deciding whether to change a threshold value of different-frequency-measurement start or a reception-quality offset used for determining a different-frequency-measurement start, which is set in the own second station, based on the measured value of the reception-quality level of the signal from the first cell included in the measurement report (MR), when the measurement report (MR) includes the cell identifier of the first cell, means for changing a value of a parameter for determination used for determining the different-frequency-measurement start, based on a result of the deciding, and means for notifying the changed value of the parameter for determination to the mobile station connected to the own second base station.

Herein, the foregoing second base station of the same frequency may perform a determination to change the value of the parameter for determination, in case that the reception-quality level from the first base station reported in the measurement report (MR) from the mobile station is larger than a parameter of different-frequency-measurement start of the second cell under connecting to which the mobile station is connected.

The foregoing second base station of the same frequency may comprise means for transmitting a command that requests a handover from the own second base station to the first cell, to the mobile station, when the measurement report (MR) including the cell identifier of the first cell is received a predetermined number of times from the mobile station connected to the own second base station, after changing the value of the parameter for determination. The foregoing second base station of the same frequency may transmit the command that requests the handover from the own station to the first cell to the mobile station, when the measurement report (MR) including the cell identifier of the first cell is received a predetermined number of times within a predetermined period of time.

In the foregoing communication system, the communication system may comprise a management apparatus for managing the second base station, and the management apparatus may comprise means for obtaining the measurement report (MR) including the measurement result of the reception-quality level measured at the same frequency and the cell identifier of the receiving target cell, which is reported by the mobile station connected to the second cell of the same frequency, means for deciding whether to change the value of the parameter for determination used for determining the different-frequency-measurement start, which is set in the second base station of the same frequency, based on the measured value of the reception-quality level of the signal from the first cell, which is included in the measurement report (MR), when the measurement report (MR) includes the cell identifier of the first cell, means for changing the value of the parameter for determination based on a result of the deciding, and means for setting the changed value of the parameter for determination in the second base station of the same frequency as notification information to be notified to the mobile station connected to the second cell of the same frequency.

In the foregoing communication system, the changed value of the parameter for determination may be notified to a part or all of the mobile stations from which the measurement report (MR) including the cell identifier of the first cell are transmitted, among the plural mobile stations connected to the second cell of the same frequency. Herein, the changed values of the parameter for determination after changing, which is to be notified to the plural mobile stations, may be the same value for each other among the mobile stations, or may be different value for each other among the mobile stations.

In the foregoing communication system, a timing of different-frequency-measurement start may be advanced by increasing a threshold value of different-frequency-measurement start, or the timing of different-frequency-measurement start may be delayed by decreasing a threshold value of different-frequency-measurement start.

In the foregoing communication system, the value of the parameter for determination may be dynamically changed based on an availability of frequency resources.

In the foregoing communication system, the value of the parameter for determination may be dynamically changed based on a change in load status of a communication capacity of the first base station.

In the foregoing communication system, the value of the parameter for determination may not be changed for an area in which a connection to the first cell is desired to be prioritized.

A base station according to another aspect of the present invention is a base station forming a second cell in an overlay cell configuration in which one or more first cells, one or more second cells of a same frequency using a same downlink frequency as the first cell, and one or more third cells of a different frequency using a downlink frequency different from that of the first cell are overlapped with each other at least partially. This base station forming the second cell comprises: means for receiving a measurement report (MR) including a measurement result of a reception-quality level measured at the same frequency and a cell identifier of a receiving target cell from a mobile station connected to the own base station; means for deciding whether to change a value of a parameter for determination used for determining a different-frequency-measurement start, which is set in the own base station, based on the measured value of the reception-quality level of the signal from the first cell included in the measurement report (MR), when the measurement report (MR) includes the cell identifier of the first cell; means for changing the value of the parameter for determination based on a result of the deciding; and means for notifying the changed value of the parameter for determination, to the mobile station connected to the own station.

A management apparatus according to yet another aspect of the present invention is a management apparatus for managing base stations in an overlay cell configuration including one or more first cells, a second cell of the same frequency that has a cell size smaller than that of the first cell and uses the same downlink frequency as that of the first cell, and a third cell of a different frequency using a downlink frequency different from that of the first cell. This management apparatus comprises means for obtaining a measurement report (MR) including a measurement result of a reception-quality level measured at the same frequency and a cell identifier of a receiving target cell, which is reported by a mobile station connected to the second cell of the same frequency, means for deciding whether to change a value of a parameter for determination used for determining a different-frequency-measurement start, which is set in a second base station forming the second cell of the same frequency, based on the measured value of the reception-quality level of the signal from the first cell, which is included in the measurement report (MR), when the measurement report (MR) includes the cell identifier of the first cell, means for changing the value of the parameter for determination based on a result of the deciding, and means for setting the changed value of the parameter for determination in the second base station of the same frequency as notification information for notifying the mobile station connected to the second cell of the same frequency.

A handover control method according to yet another aspect of the present invention is a handover control method for controlling a handover of mobile station in an overlay cell configuration in which one or more first cells, one or more second cells of a same frequency using a same downlink frequency as the first cell, and one or more third cells of a different frequency using a downlink frequency different from that of the first cell are overlapped with each other at least partially. This hand over control method includes: obtaining a measurement report (MR) including a measurement result of a reception-quality level measured at the same frequency and a cell identifier of a receiving target cell, which is reported by a mobile station connected to the second cell of the same frequency; deciding whether to change a value of a parameter for determination used for determining a different-frequency-measurement start, based on the measured value of the reception-quality level of the signal from the first cell, which is included in the measurement report (MR), when the measurement report (MR) includes the cell identifier of the first cell; and changing the value of the parameter for determination based on a result of the deciding.

A program according to yet another aspect of the present invention is a program executed by a computer or processor provided in a base station forming a second cell, in an overlay cell configuration in which one or more first cells, one or more second cells of a same frequency using a same downlink frequency as the first cell, and one or more third cells of a different frequency using a downlink frequency different from that of the first cell are overlapped with each other at least partially. This program includes a program code for receiving a measurement report (MR) including a measurement result of a reception-quality level measured at the same frequency and a cell identifier of a receiving target cell from a mobile station connected to the own base station, a program code for deciding whether to change a value of a parameter for determination used for determining a different-frequency-measurement start, which is set in the own base station, based on a measured value of a reception-quality level of a signal from the first cell, which is included in the measurement report (MR), when the measurement report (MR) includes the cell identifier of the first cell, a program code for changing the value of the parameter for determination based on a result of the deciding, and a program code for notifying the changed value of the parameter for determination after changing, to the mobile station connected to the own base station.

A program according to yet another aspect of the present invention is a program executed by a computer or processor provided in a management apparatus for managing base stations, in an overlay cell configuration including one or more first cells, a second cell of the same frequency that has a cell size smaller than that of the first cell and uses the same downlink frequency as that of the first cell, and a third cell of a different frequency using a downlink frequency different from that of the first cell. This program includes a program code for obtaining a measurement report (MR) including a measurement result of a reception-quality level measured at the same frequency and a cell identifier of a receiving target cell, which is reported by a mobile station connected to the second cell of the same frequency, a program code for deciding whether to change a value of a parameter for determination used for determining a different-frequency-measurement start, which is set in a second base station forming the second cell of the same frequency, based on the measured value of the reception-quality level of the signal from the first cell, which is included in the measurement report (MR), when the measurement report (MR) includes the cell identifier of the first cell, a program code for changing the value of the parameter for determination based on a result of the deciding, and a program code for setting the changed value of the parameter for determination in the second base station of the same frequency as notification information to be notified to the mobile station connected to the second cell of the same frequency.

In the foregoing communication system, the foregoing base station, the foregoing handover control method and the foregoing program, the parameter for determination may be a threshold value of different-frequency-measurement start that is compared with the measured value of the reception-quality level of the signal from the first cell, a reception-quality offset that is added to or subtracted from the measured value of the reception-quality level of the signal from the first cell, or, both of the threshold value of different-frequency-measurement start and the reception-quality offset.

The second base station of the same frequency may be a small-cell base station disposed on the ground or on the water, or a small-cell base station disposed in a flying object that flies at a lower altitude than the first base station, the third base station of the different frequency may be a macro-cell base station disposed on the ground or on the water, or a macro-cell base station disposed in a flying object that flies at a lower altitude than the first base station, and the first base station may be a base station disposed at the same or higher position than the second base station and the third base station.

The first base station may be a macro-cell base station, and each of the second base station of the same frequency and the third base station of the different frequency may be a small cell base station.

Advantageous Effects of Invention

According to the present invention, in an overlay cell configuration in which a first cell, a second cell of a same frequency and a third cell of a different frequency are overlapped at least partially with each other, when a reception level of the second cell of the same frequency is lower than that of the first cell, it is possible to prevent a concentration of communication traffic on the first cell by preferentially performing a handover of a mobile station connected to a second base station that uses the same frequency as the first cell for a downlink of a service link, to a third base station of the different frequency.

DESCRIPTION OF EMBODIMENTS

Hereinafter, embodiments of the present invention are described with reference to the drawings. Herein, although the embodiments of the present invention will be described on the premise of application to the LTE/LTE-Advanced, the concept of the present invention can be applied to any system as long as it is a system using a similar cell configuration and physical channel configuration.

First, an overall configuration of a mobile communication system to which the present invention can be applied is described.

Figure 1:
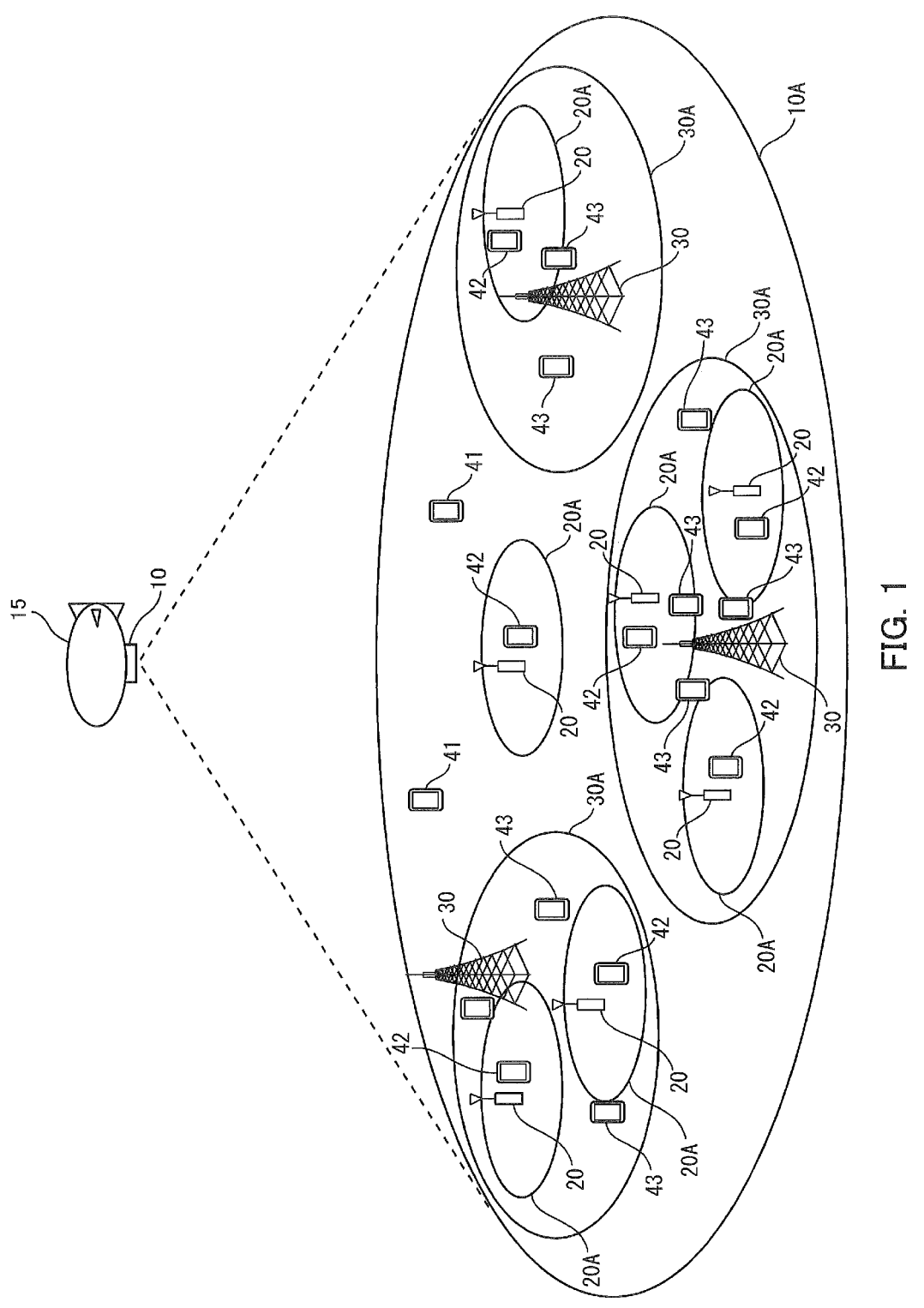
FIG. 1 is an illustration showing an example of a schematic configuration of a mobile communication system having an overlay cell configuration in which plural terrestrial cells are disposed in a large zone cell according to the present embodiment.

FIG. 1 is an illustration showing an example of a schematic configuration of a mobile communication system having an overlay cell configuration in which plural terrestrial cells 20A and 30A are disposed in a large zone cell 10A according to an embodiment of the present invention. As a countermeasure against disasters and an elimination of out-of-service areas, it is effective to deploy one or more large zone cells (first cells) 10A of a large size formed from an aerial-floating type communication relay apparatus 15 toward on the ground or on the water. As a countermeasure for rapidly increasing mobile communication traffic in the large zone cell 10A, it is effective to apply an overlay cell configuration in which plural terrestrial cells 20A and 30A are superimposed on the large zone cell 10A. Since the large zone cell 10A in the present embodiment is formed from the upper airspace, it is also called an "upper airspace cell".

In FIG. 1, the plural terrestrial cells 20A and 30A include a terrestrial cell (second cell) of the same frequency F1 in which a same frequency (frequency band) F1 as the large zone cell 10A is used for a radio communication of a service link with a user terminal apparatus (hereinafter, also referred to as "UE") which is a mobile station, and a terrestrial cell (third cell) of the different frequency F2 in which a frequency (frequency band) F2 different from that of the large zone cell 10A is used for radio communication of the service link with the UE.

The terrestrial cells 20A and 30A may include a macro cell 30A and a small cell 20A smaller than the macro cell 30A. The small cell 20A may be formed inside the macro cell 30A, or may be formed outside the macro cell 30A. In the example of FIG. 1, although one or plural small cells 20A are located in the macro cell 30A and the whole of the small cell 20A overlaps with the macro cell 30A, a part of the small cell 20A may overlap with the macro cell 30A. Although FIG. 1 exemplifies a case where the number of small cells 20A disposed in the large zone cell 10A is seven, and the number of macro cells 30A disposed in the large zone cell 10A is three, the number is not limited to these numbers of cells. For example, the number of small cells 20A disposed in the large zone cell 10A may be one to six, or may be eight or more. Further, the number of macro cells 30A disposed in the large zone cell 10A may be one to two, or may be four or more.

Herein, the terrestrial cell of the same frequency F1 may be a macro cell and the terrestrial cell of the different frequency F2 may be a small cell smaller than the macro cell, or conversely, the terrestrial cell of the same frequency F1 may be a small cell and the terrestrial cell of different frequency F2 may be a macro cell. The macro cell of the same frequency F1 and the macro cell of the different frequency F2 may be overlapped and formed from a common base station toward a common area, or the small cell of the same frequency F1 and the small cell of the different frequencies F2 may be overlapped and formed from a common base station toward a common area. Further, the macro cell (or small cell) of the same frequency F1 and the macro cell (or small cell) of the different frequency F2 may be overlapped and formed from base stations different from each other.

The frequencies F1 and F2 used in the respective cell 10A, 20A, and 30A may be, for example, frequencies in the microwave band of 300 MHz to 30 GHz or frequencies in the millimeter wave band higher than 30 GHz. Further, the frequency of the service link of the respective cell 10A, 20A, 30A may be, for example, 700 MHz band (Band 28), 900 MHz band (Band 8), 1.5 GHz band (Band 11), 1.7 GHZ band (Band 3) or 2 GHz band (Band 1).

A UE 41 in FIG. 1 locates in the large zone cell 10A and is connected to the cell 10A. A UE 42 in FIG. 1 locates in the small cell 20A and is connected to the cell 20A, and a UE 43 locates in the macro cell 30A and is connected to the cell 30A.

In the overlay cell configuration of FIG. 1, since the frequency utilization efficiency can be enhanced by using the same frequency between the large zone cell 10A and the macro cell 30A of the same frequency, and an interference from the large zone cell 10A can be prevented by performing a handover of the UE 42 located in a boundary area of the macro cell 30A of the same frequency to another macro cell 30A or the small cell 20A of the different frequency as necessary, so that the communication quality (for example, throughput) in UEs 41, 42, and 43 can be increased.

In FIG. 1, the mobile communication system of the present embodiment is a communication system that complies with the LTE (Long Term Evolution)/LTE-Advanced or the next-generation standard specifications such as the 5th generation, and is provided with a movable large-zone cell base station 10 as a first base station mounted on the communication relay apparatus 15 and a plurality of terrestrial-cell base stations 20 and 30 fixedly disposed in the large zone cell 10A which is a radio communication area of the large-zone cell base station 10.

The terrestrial-cell base stations 20 and 30 include, for example, a second base station of the same frequency F1 that uses the same first frequency band (frequency F1) as the large-zone cell base station 10 for radio communication of the service link, and a third base station of a different frequency that uses a second frequency band (frequency F2) different from the frequency F1 of the large-zone cell base station 10 for radio communication of the service link. As shown in FIG. 1, the plurality of terrestrial-cell base stations may include the macro-cell base station 30 and the small-cell base station 20.

Herein, the terrestrial-cell base station (second base station) of the same frequency F1 may be a macro-cell base station and the terrestrial-cell base station (third base station) of the different frequency F2 may be a small-cell base station, or conversely, the terrestrial-cell base station (second base station) of the same frequency F1 may be a small-cell base station and the terrestrial-cell base station (third base station) of the different frequency F2 may be a macro-cell base station. The terrestrial-cell base station 30 may be a common macro base station that overlaps and forms a macro cell of the same frequency F1 and a macro cell of the different frequency F2 toward a common area. Further, the terrestrial-cell base station 20 may be a common small-cell base station that overlaps and forms a small cell of the same frequency F1 and a small cell of the different frequency F2 toward a common area.

The large-zone cell base station 10 is a base station (for example, eNodeB, gNodeB) as a relay communication station mounted on the aerial-floating type communication relay apparatus 15 configured with a flying object that can move over the upper airspace, and is capable of relaying the radio communication of the feeder link FL on the mobile communication network side and the radio communication of the service link SL on the mobile station side.

Although FIG. 1 shows an example in which the relay communication station mounted on the communication relay apparatus 15 in the upper airspace is the large-zone cell base station 10, the large-zone cell base station 10 may be provided in a gateway station on the ground side, or may be provided in an apparatus connected to the gateway station on the ground side. In this case, the relay communication station mounted on the communication relay apparatus 15 functions as a repeater that relays the radio communication of the feeder link FL with the large-zone cell base station 10 and the radio communication of the service link SL with the UE (mobile station).

Although FIG. 1 shows an example in which the communication relay apparatus 15 mounted on the large-zone cell base station 10 is an airship as a flying object that can move over the upper airspace, the communication relay apparatus 15 may be another unmanned or manned flying object such as a drone, a balloon, an aircraft, a helicopter, a solar-plane type HAPS ("high altitude platform station" or "high altitude pseudo satellite") or LAPS ("low altitude platform station" or "low altitude pseudo satellite"), an airship type HAPS or LAPS, or an artificial satellite which is capable of moving or flying over the upper airspace. After moving to a predetermined position in the upper airspace located during the operation of performing radio relay, the communication relay apparatus 15 may be controlled to stay at the position or to circulate in a predetermined range of flight space including the position.

The flying object may be controlled to fly and may be located in an airspace at an altitude of 100 [km] or less from the ground level, sea level, or water surface such as a river or a lake by autonomous control or external control, or by the control of the operator boarding the flying object. The flight airspace of the flying object may be a stratospheric airspace at an altitude of 11 [km] or more and 50 [km] or less. Further, the flight airspace of the flying object may be an airspace at an altitude of 15 [km] or more and 25 [km] or less in which the weather conditions are relatively stable, and particularly an airspace at an altitude of about 20 [km].

The large-zone cell base station 10 may be a base station disposed at a position (including the position in the atmosphere and the position in outer space outside the atmosphere) higher than the terrestrial-cell base station (second base station) such as the small-cell base station 20 and the macro-cell base station 30. Each of the small-cell base station 20 and the macro-cell base station 30 may be disposed on the ground or on the water, or may be installed in a flying object that flies at an altitude lower than that of the large-zone cell base station 10. The large-zone cell base station 10 may be a macro-cell base station, and each of the second-cell base station of the same frequency F1 as the macro-cell base station and the second-cell base station of the different frequency F2 different from that of the macro-cell base station may be a small-cell base station.

The large-zone cell base station 10 may be disposed on the ground. For example, the large-zone cell base station 10 may be disposed on the mountain of high altitudes, etc.

The macro-cell base station 30 is a high-power base station which is disposed outdoors in a mobile communication network and covers a terrestrial cell that is a normal wide area with a radius of about several hundred meters to ten and several kilometers. The macro-cell base station 30 is connected to another base station by, for example, a wired communication line, and can communicate by a predetermined communication interface. The macro-cell base station 30 is connected to a core network of the mobile communication network via a line termination apparatus and a communication line such as a dedicated line, and can communicate with various nodes such as a server on the core network by a predetermined communication interface.

Unlike the macro cell base station 30 of the wide area, the small-cell base station 20 is a small-output base station that has a radio communication range of several meters to several hundred meters and can be disposed inside a building such as a general home, a store and an office. The small-cell base station 20 is also connected to the core network of the mobile communication network via the line termination apparatus and communication lines such as broadband-public communication lines such as an ADSL (Asymmetric Digital Subscriber Line) line and an optical line, and can communicate with various nodes such as a server apparatus on the core network by the predetermined communication interface.

The small-cell base station 20 and the macro-cell base station 30 in the large-zone cell 10A may be base stations disposed on the ground or on the water, or may be base stations disposed in low-altitude flying objects such as a drone, balloon, helicopter and aircraft.

In FIG. 1, the UE 41, which is a first mobile station, is a user equipment (MUE) located in the large zone cell 10A of the frequency F1 and connected to the large-zone cell base station 10, and is in a state capable of radio communication for telephone, data communication, and the like, via the large-zone cell base station 10.

The UE 42, which is a part of second mobile stations, is a user equipment (SUE) located in the small cell 20A and connected to the small-cell base station 20, and is in a state capable of radio communication for telephone, data communication, and the like, via the small-cell base station 20.

The UE 43, which is another second mobile station, is a user equipment (SUE) located in the macro cell 30A and connected to the macro-cell base station 30, and is in a state capable of radio communication for telephone, data communication, and the like, via the small-cell base station 20.

When each of the UEs 41, 42, and 43 is located in the large zone cell 10A, the small cell 20A and the macro cell 30A, each of the UEs 41, 42, and 43 can perform a radio communication with the large-zone cell base station 10, the small-cell base station 20 or the macro-cell base station 30 that corresponds to the cell in which the UE locates in the area, by using a predetermined communication method and a radio communication resource. Each of the UEs 41, 42, and 43 is configured by using hardware such as, for example, a computer apparatus having a CPU and a memory, etc., an external-communication interface section for a core network, and a radio communication section, and can perform a radio communication with the base stations 10, 20, 30, etc., by executing a predetermined program.

In the present embodiment, each of the large-zone cell base station 10, the small-cell base station 20 and the macro-cell base station 30 is configured by using hardware such as, for example, a computer apparatus having a CPU and a memory, etc., an external-communication interface section for a core network, and a radio communication section, and can perform various processes such as a handover for suppressing interference described later, and can perform radio communication with UEs 41, 42, and 43 by using a predetermined communication method and a radio communication resource, by executing a predetermined program.

Each base station 10, 20 and 30 is a base station capable of performing a downlink radio communication of an OFDM (Orthogonal Frequency Division Multiplexing) method for a UE that is a mobile station. The base stations 10, 20 and 30 are respectively provided with, for example, an antenna, a radio-signal path switching section, a transmission/reception duplexer (DUP: Duplexer), a downlink-radio reception section and an OFDM (Orthogonal Frequency Division Multiplexing) demodulation section, an uplink-radio reception section, a SC-FDMA (Single-Carrier Frequency-Division Multiple Access) demodulation section, and the like. Further, each base station 10, 20 and 30 is provided with an OFDM modulation section, a downlink-radio transmission section, a control section, and the like.

The SC-FDMA demodulation section performs a demodulation process of the SC-FDMA method for the reception signal received by the uplink-radio reception section, and passes the demodulated data to the control section. The OFDM modulation section modulates the down signal data, which is received from the control section and transmitted to the UE in the area of the cell of the own station, by the OFDM method so that the data is transmitted with a predetermined power. In case that the base station receives, for example, information on the subframe to be stopped transmission from the server, the OFDM modulation section is controlled to stop the down transmission only for a specific subframe in the radio communication frame. The downlink-radio transmission section transmits the transmission signal modulated by the OFDM modulation section via the transmission/reception duplexer, the radio-signal path switching section, and the antenna.

The control sections of the base stations 10, 20 and 30 are respectively configured with, for example, a computer apparatus, and control each section or execute various processes, by reading and executing a predetermined program. The control sections also respectively function as means for performing a process for handover of the UEs 41, 42 and 43 in cooperation with the external-communication interface section for the core network.

Figure 2:
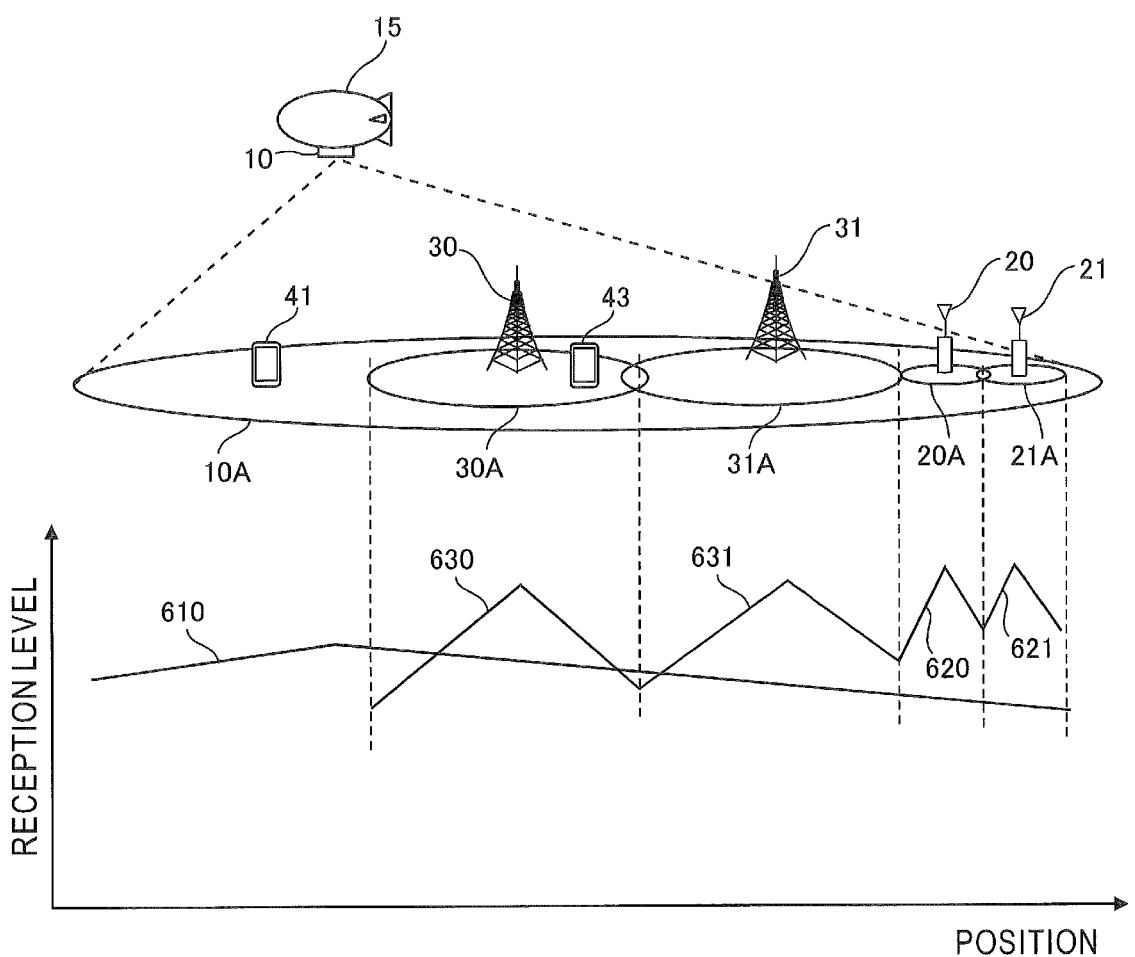
FIG. 2 is an illustration showing an example of sharing between cells of downlink frequency in a service link of a mobile communication system according to a reference example.

FIG. 2 is an illustration showing an example of sharing between cells of downlink frequency in a service link of a mobile communication system having an overlay cell configuration according to a reference example. In FIG. 2, the macro cells 30A and 31A adjacent to each other are respectively formed by the macro-cell base stations 30 and 31 installed in a suburban area. On the other hand, the small cells 20A and 21A adjacent to each other are respectively formed by the small-cell base stations 20 and 21 that are densely disposed in an urban area. The large-zone cell 10A is formed so as to cover the whole of macro cells 30A and 31A and the small cells 20A and 21A. The horizontal axis in the lower figure of FIG. 2 represents a position in the horizontal direction in the figure traversing each cell 10A, 30A, 31A, 20A and 21A, and the vertical axis represents reception levels 610, 630, 631, 620 and 621 of desired signals received by the UE in each cell 10A, 30A, 31A, 20A and 21A.

In FIG. 2, in the urban area, the reception levels 620 and 621 of the desired signals in the small cells 20A and 21A, which are terrestrial cells, are large, and a visibility rate from the upper airspace is low. Therefore, the reception levels 620 and 621 from the small-cell base stations 20 and 21 are considerably larger than the reception level 610 from the large-zone cell base station 10, and it is possible to reuse of the frequency (simple frequency sharing) with the large zone cell 10A in the whole of urban area.

In the central parts of the macro cells 30A and 31A that are terrestrial cells in the suburbs where the visibility rate from the upper airspace is high, the reception levels 630 and 631 from the macro-cell base stations 30 and 31 are larger than the reception level 610 from the large-zone cell base station 10, and the frequency can be shared with the large zone cell 10A. However, at the cell ends of the macro cells 30A and 31A, since the reception levels 630 and 631 from the macro-cell base stations 30 and 31 are smaller than the reception level 610 from the large-zone cell base station 10, it occurs of an interference from the large zone cell 10A. Therefore, when trying to share the frequency with the large zone cell 10A, even if another macro cell which is a terrestrial cell, is adjacent to the macro cell at the cell ends of the macro cells 30A and 31A, it is not capable of performing a handover to the macro cell and the UE 43 cannot maintain a connection to the terrestrial cell, and it is not possible to prevent the concentration of communication traffic on the large zone cell 10A due to a handover to the large zone cell 10A having a small communication traffic capacity per unit area.

Therefore, in the present embodiment, a terrestrial cell using the same frequency F1 as the large zone cell 10A and a terrestrial cell of the different frequency F2 are formed in a common area such as a suburb, when the UE connected to the terrestrial cell of the same frequency F1 is located at the end of the cell, the concentration of communication traffic on the large zone cell 10A is avoided by preferentially performing a handover to the terrestrial cell of the different frequency F2 instead of the large zone cell 10A.

When the UE connected to the terrestrial cell of the same frequency F1 is located at the end of the cell, in the case of preferentially performing a handover to the terrestrial cell of the different frequency F2, there is a following problem. When the reception level from the base station of the large zone cell 10A is high in the area where the reception level from the terrestrial-cell base station to which the UE is connected is low, before the reception level from the connected base station of the terrestrial cell of the same frequency F1 reaches a predetermined threshold value (fixed value) for starting the search of different frequencies, there is a possibility that a handover may occur from the connected base station of the terrestrial cell of the same frequency F1 to the base station of the large zone cell 10A of the same frequency F1. If it is not possible to perform a handover to the base station of the terrestrial cell of the different frequency F2 due to the occurrence of the handover to the base station of the large zone cell 10A of the same frequency F1, it is not possible to prevent the concentration of communication traffic to the large zone cell 10A.

Therefore, particularly in the present embodiment, in order to prevent the concentration of communication traffic on the large zone cell 10A, it is provided of: means for deciding whether to change a value of parameter for determination used for determining a different-frequency-measurement start, which is set in the terrestrial-cell base station 30 of the same frequency F1, based on a measured value of reception-quality level of a signal from the large zone cell 10A included in a measurement report (MR) reported by the UE connected to the terrestrial cell 30A of the same frequency F1, when a cell identifier of the large zone cell 10A is included in the measurement report (MR) that includes the measurement result of reception level measured at the same frequency F1 and a cell identifier of a receiving target cell; and means for changing the value of the parameter for determination based on a result of the deciding.

In the present embodiment, the parameter for determination is, for example, a threshold value Th0 of different-frequency-measurement start, which is compared with the measured value of the reception-quality level of the signal from the large zone cell 10A, a reception-quality offset Offset0 that is added to or subtracted from the measured value of the reception-quality level of the signal from the large zone cell 10A, or both of the threshold value and the reception-quality offset.

Each of the specific values of the threshold value Th0 of different-frequency-measurement start and the reception-quality offset is set to a value that is higher or lower than the reception-quality level of the reception from the large zone cell 10A of the measurement report (MR) including the cell identifier of the large zone cell 10A reported from the UE.

The determination whether to change the value of the parameter for determination and the change of the value of the parameter for determination can be performed, for example, by a management apparatus that manages the terrestrial-cell base station 30.

For example, the terrestrial-cell base station 30 is provided with a radio communication section that wirelessly communicates with the UE 43, a data processing section that processes data to be transmitted and received, a NW communication section that communicates with the core network side of the mobile communication network by a wired or radio communication interface, and a control section consisting of CPU, memory, etc. that controls each section. In case that the terrestrial-cell base station 30 of the same frequency F1 performs the determination and change of the threshold value, the control section of the terrestrial-cell base station 30 also functions, for example, as following means of MA1 to MA4 by reading and executing a predetermined control program and cooperating with each of the sections.

MA1: means for receiving a measurement report (MR) including a measurement result of a reception-quality level measured at the same frequency F1 and a cell identifier of a receiving target cell, from the UE 43 connected to the own station.

MA2: means for deciding whether to change the value of the parameter for determination (threshold value Th0 of different-frequency-measurement start, reception-quality offset Offset0, or, both of them) used for determining the different-frequency-measurement start that is set in the own station, based on the measured value of the reception-quality level of the signal from the large zone cell 10A included in the measurement report (MR), when the measurement report (MR) includes the cell identifier (PCI) of the large zone cell 10A.

MA3: means for changing the value of the parameter for determination based on a result of the deciding.

MA4: means for notifying the value of parameter for determination after changing, to the UE 43 that transmits the measurement report (MR) including the cell identifier (PCI) of the large zone cell 10A, among the UE 43s connected to the own station.

The determination and change of the value of parameter for determination may be performed by a management apparatus installed in a mobile communication network or the like so as to manage respective base stations remotely and centrally by communicating with plural base stations. The management apparatus is provided with a database (DB) that stores management information on each base station, a NW communication section that communicates with each base station via a mobile communication network or the Internet, etc. by a wired or radio communication interface, an information processing section that processes various kinds of information, and a control section consisting of CPU, memory, etc. that controls each section. In case that the management apparatus performs the foregoing determination and change of the threshold value, the control section of the management apparatus also functions, for example, as following means of MB1 to MB4 by reading and executing a predetermined control program and cooperating with each of the sections.

MB1: means for obtaining a measurement report (MR) including a measurement result of a reception-quality level measured at the same frequency F1 reported by the UE 43 connected to the terrestrial cell 30A of the same frequency F1 and a cell identifier of a receiving target cell.

MB2: means for deciding whether to change the value of the parameter for determination (threshold value Th0 of different-frequency-measurement start, reception-quality offset Offset0, or both of them) used for determining the different-frequency-measurement start, which is set in the terrestrial-cell base station 30 of the same frequency F1, based on the measured value of the reception-quality level of the signal from the large zone cell 10A included in the measurement report (MR), when the measurement report (MR) includes the cell identifier (PCI) of the large zone cell 10A.

MB3: means for changing the value of the parameter for determination based on a result of the deciding.

MB4: means for setting the changed value of the parameter for determination to the terrestrial cell 30A of the same frequency F1 as notification information to be notified to the UE 43 connected to the terrestrial cell 30A of the same frequency F1.

Figure 3:
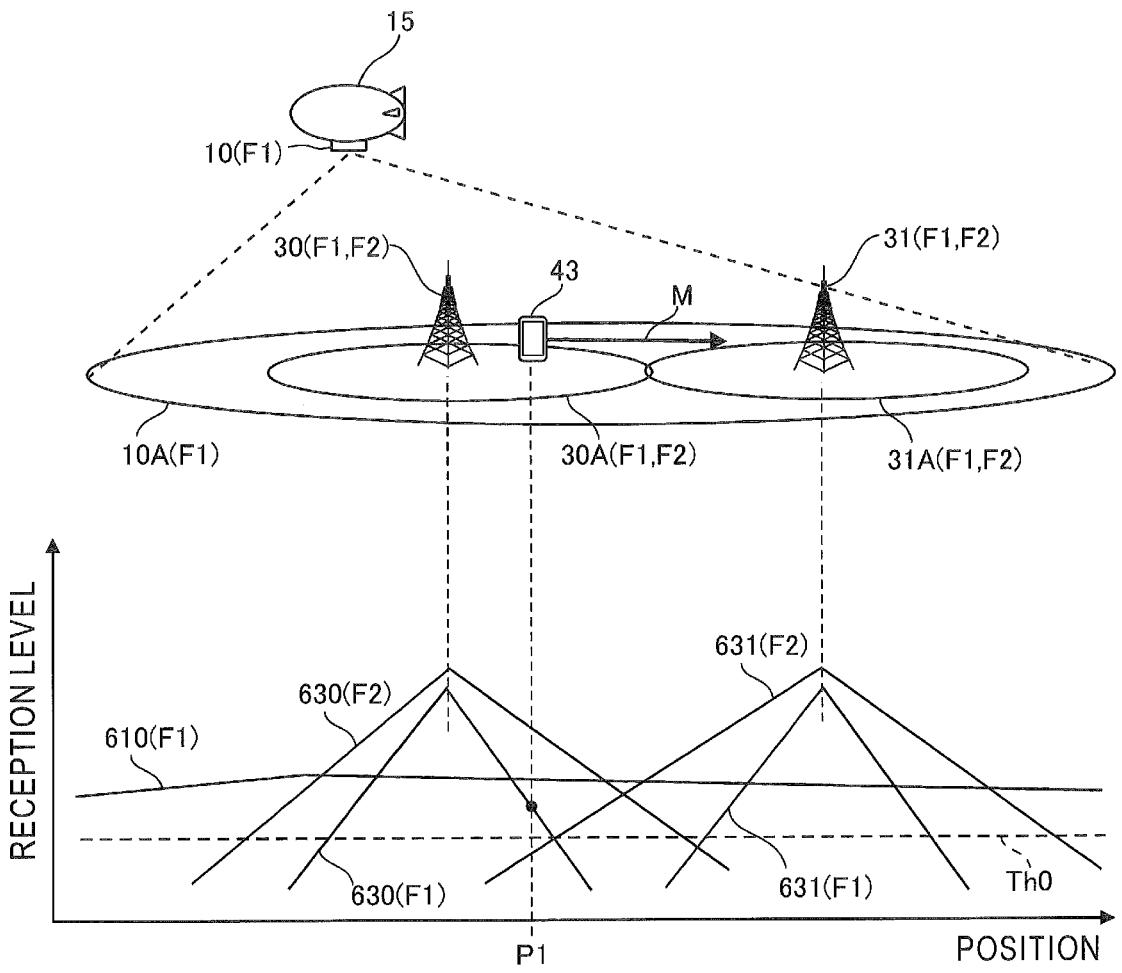
FIG. 3 is an illustration showing an example of sharing between cells of downlink frequency in a service link of a mobile communication system according to the present embodiment.

FIG. 3 is an illustration showing an example of sharing between cells of downlink frequencies in a service link of a mobile communication system having an overlay cell configuration according to an embodiment. In FIG. 3, the large-zone cell base station 10 forms a large zone cell 10A(F1) of frequency F1 over a wide area. By the terrestrial-cell base stations 30 and 31 such as macro-cell base stations, inside the large zone cell 10A(F1) of frequency F1, terrestrial cells 30A(F1) and 31A(F1) such as macro cells of the same frequency F1 and terrestrial cells 30A(F2) and 31A (F2) such as macro cells of the different frequency F2 are formed adjacent to each other. The different frequency F2 is lower than the same frequency F1, and the cell sizes of the terrestrial cells 30A(F2) and 31A(F2) of the different frequency F2 are wider than the cell sizes of the terrestrial cells 30A(F1) and 31A(F1) of the same frequency F1. The large zone cell 10A(F1) shares the frequency F1 of the downlink of the service link with the terrestrial cells 30A(F1) and 31A(F1).

The terrestrial-cell base station 30 is a base station shared by the terrestrial cell 30A of the frequencies F1 and F2 different from each other, and forms the terrestrial cell 30A(F1) of the frequency F1 and the terrestrial cell 30A(F2) of the frequency F2 in a common area. The terrestrial-cell base station 31 is a base station shared by the terrestrial cell 31A of the frequencies F1 and F2 different from each other, and forms the terrestrial cell 31A(F1) of the frequency F1 and the terrestrial cell 31A(F2) of the frequency F2 in a common area.

Although the example in FIG. 3 is an example in which the different frequency F2 is lower than the same frequency F1, the different frequency F2 may be higher than the same frequency F1.

The horizontal axis in the lower figure of FIG. 3 represents a position in the horizontal direction in the figure traversing each cell 10A(F1), 30A(F1, F2), 31A(F1, F2), and a point P1 is a position of the UE 43 connected to the terrestrial cell 30A(F1) of the same frequency F1. The UE 43 is moving from the terrestrial cell 30A toward the neighboring-terrestrial cell 31A as shown by the arrow M in the figure. The vertical axis in the lower figure of FIG. 3 represents reception revels 610(F1), 630(F1), 630(F2), 631 (F1), 631(F2) indicating the reception-quality level of the signal received by the UE in each cell 10A(F1), 30A(F1, F2), 31A(F1, F2). The reception quality of the signal received by the UE is, for example, RSRP (Reference Signal Received Power) or RSRQ (Reference Signal Received Quality). The RSRP is the reception power [dBm] of the downlink reference signal from the base station. The RSRQ is the ratio of RSRP [dBm] to the total reception power (RSSI: Received Signal Strength Indicator) [dBm] of the downlink from the base station.

The broken line Th0 in the lower figure of FIG. 3 is a threshold value of different-frequency-measurement start as a parameter for determination used for determining a different-frequency-measurement start at which the UE 43 starts a measurement (search) of the different frequency F2. A value to be compared with the threshold value of different-frequency-measurement start may be a value of reception quality (RSRP or RSRQ), or may be a value obtained by adding a predetermined reception-quality offset to the reception quality (RSRP or RSRQ).

In FIG. 3 and the following descriptions of the embodiments, although it is described of a case where the frequency F1 of the service link of the large zone cell 10A(F1), the terrestrial cell 30A(F1) and the terrestrial cell 31A(F1) is the 2 GHz band (Band 1), and the frequency F2 of the service link of the terrestrial cell 30A(F2) and the terrestrial cell 31A(F2) is the 900 MHz band (Band 8), the frequencies F1 and F2 may be other frequencies, respectively.

Figure 4:
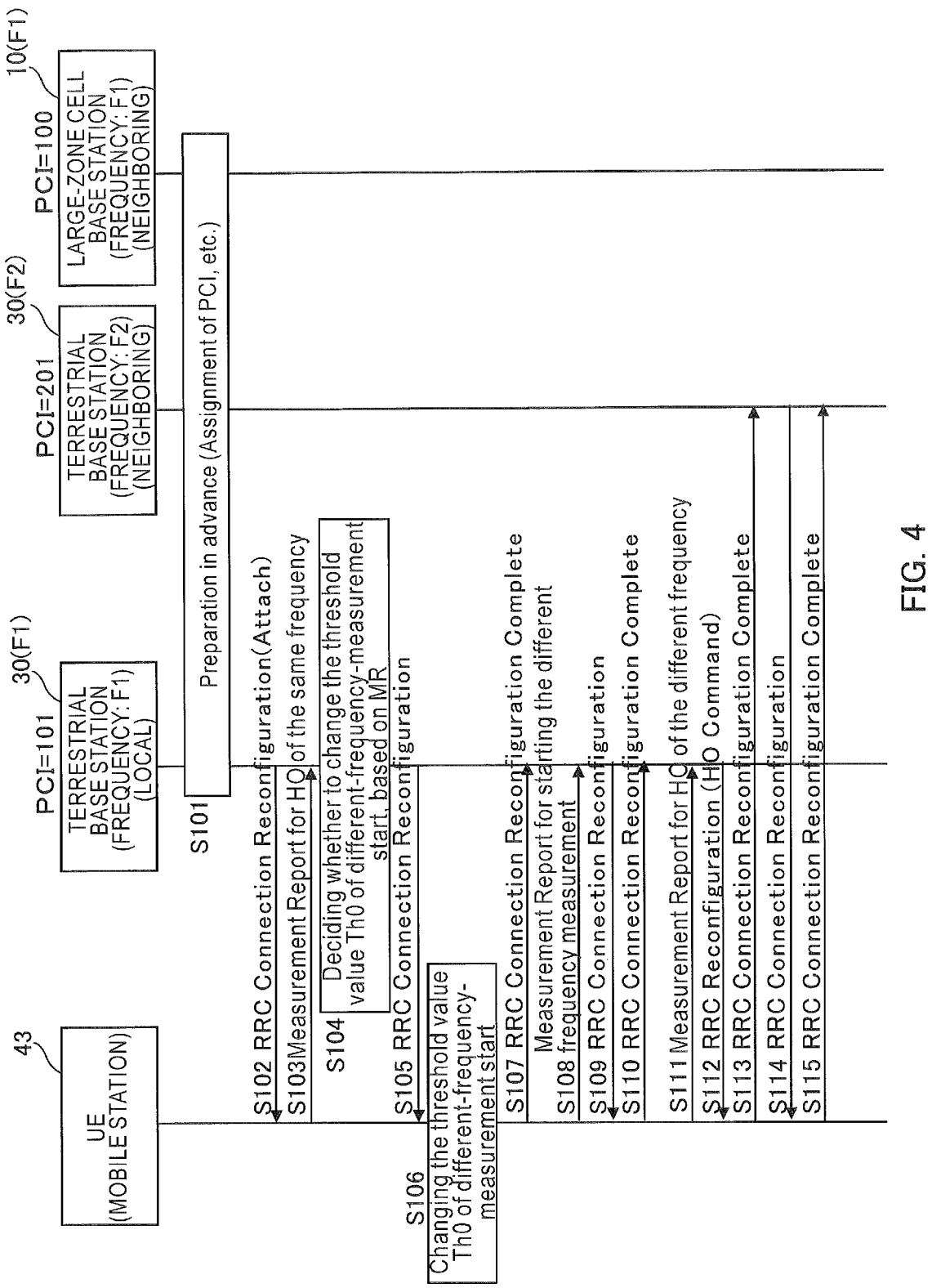
FIG. 4 is a sequence diagram showing an example of handover control between different frequencies in an overlay cell configuration of a mobile communication system according to the present embodiment.
Figure 5:
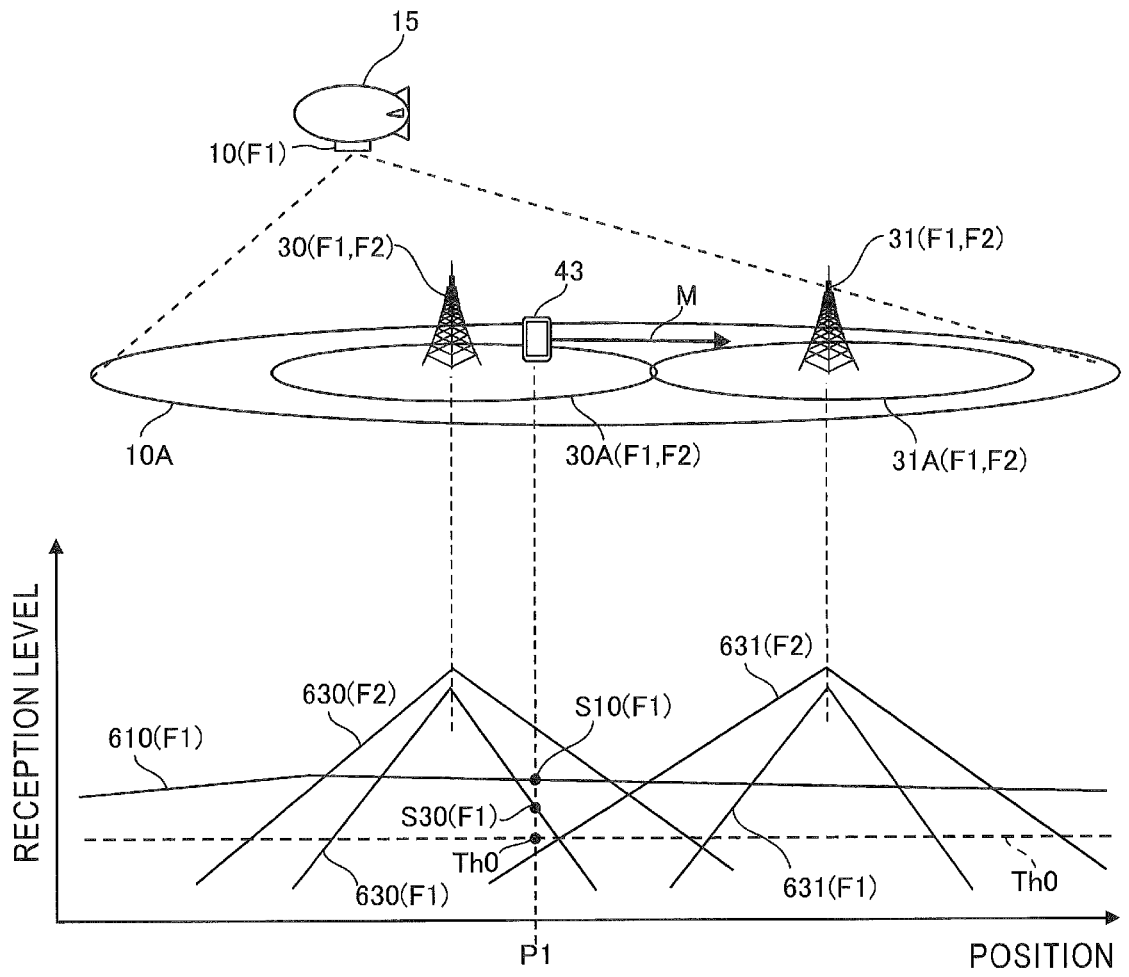
FIG. 5 is an illustration showing an example of transmission timing of a measurement report (MR) from a UE to a base station in the handover control between different frequencies of FIG. 4.
Figure 6:
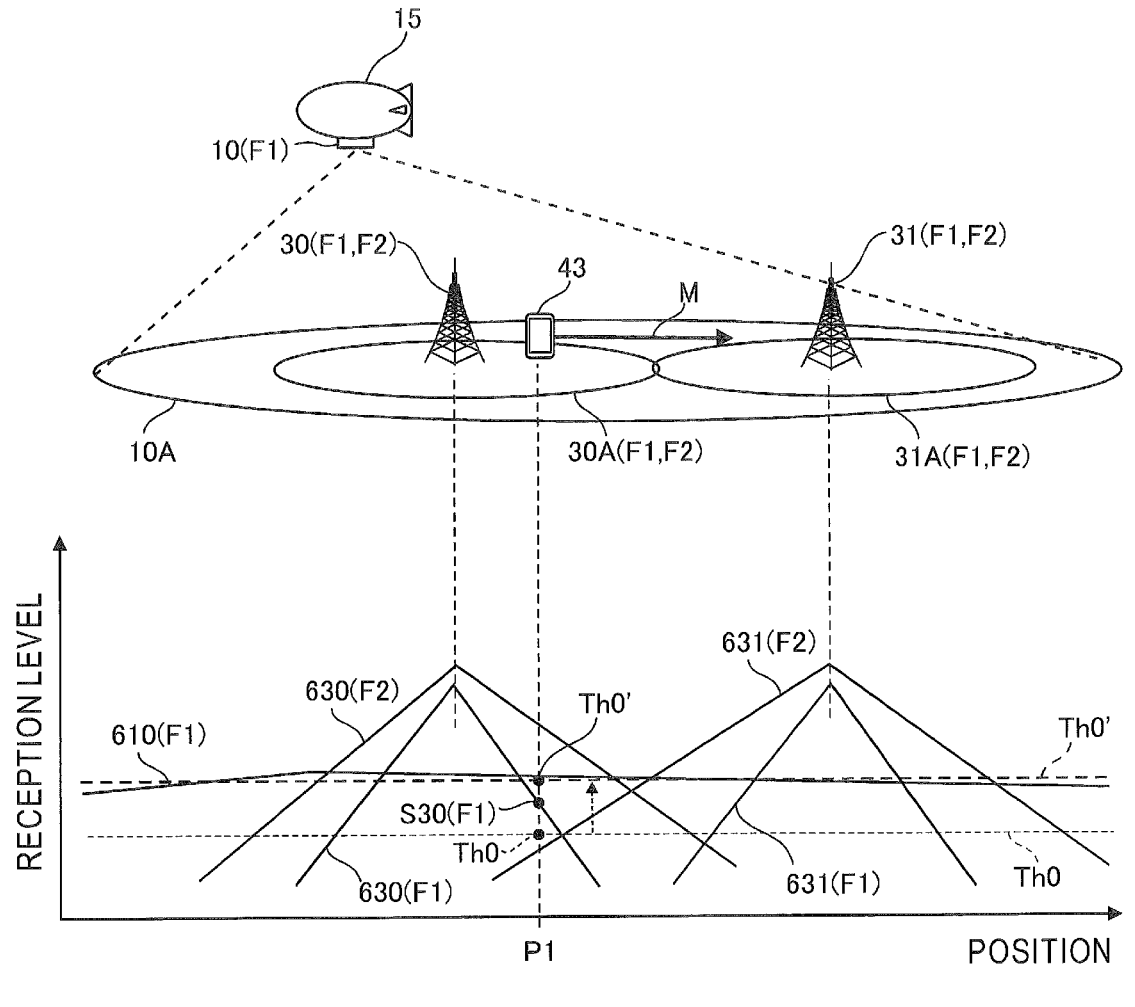
FIG. 6 is an illustration showing an example of timing of changing a threshold value of different-frequency-measurement start used for determining a different-frequency-measurement start in the handover control between different frequencies of FIG. 4.
Figure 7:
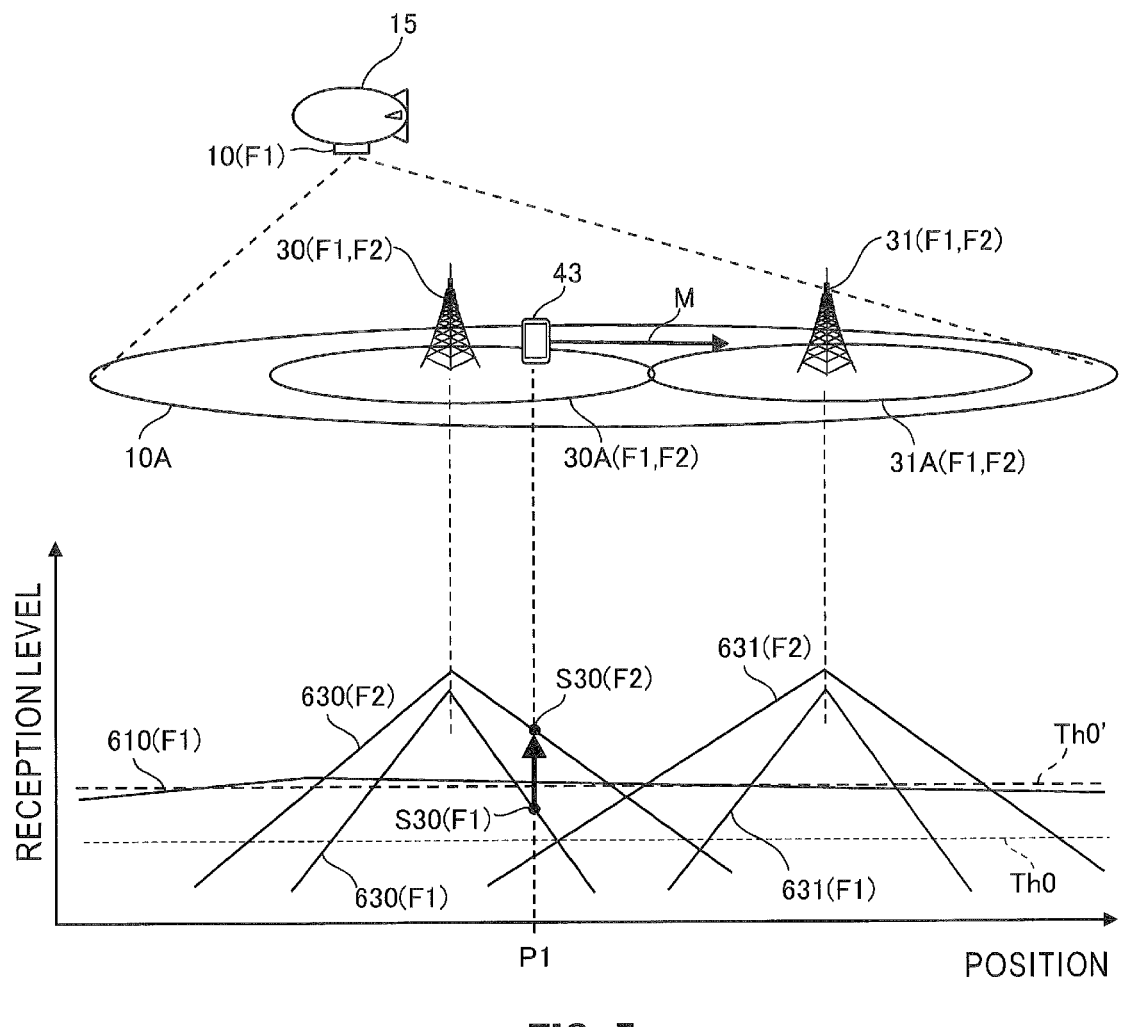
FIG. 7 is an illustration showing an example of transmission timing of a handover command to a different frequency cell in the handover control between different frequencies of FIG. 4.

FIG. 4 is a sequence diagram showing an example of handover control between different frequencies in the overlay cell configuration of the mobile communication system according to the present embodiment. FIG. 5 is an illustration showing an example of transmission timing of the measurement report (MR) from the UE to the base station in the handover between different frequencies of FIG. 4. FIG. 6 is an illustration showing an example of timing of changing the threshold value of different-frequency-measurement start used for determining the different-frequency-measurement start in the handover between different frequencies of FIG. 4. FIG. 7 is an illustration showing an example of transmission timing of a handover command to a different frequency cell in the handover between different frequencies of FIG. 4. In FIG. 4 to FIG. 7, although the threshold value Th0 of different-frequency-measurement-start is changed, the reception-quality offset Offset0 applied to the measured value of the reception-quality level at the same frequency F1 to be compared with the threshold value Th0 of different-frequency-measurement start may be changed instead of the threshold value Th0 of different-frequency-measurement start or together with the threshold value Th0 of different-frequency-measurement start (the same applies to the example in FIG. 8 described later).

In the present embodiment, in the UE 43 that performs the handover between cells, a program for executing various events defining operation triggers related to the handover shown in Table 1 is incorporated in a control section (for example, processor), and a threshold value used for each event shown in Table 1 is held in a storage section (for example, memory). The operation content and the threshold value of each event are held, for example, as setting values in the base station, and can be notified from the base station to the UE as parameters of notification information. It is noted that only one of the offset On(A3) and the offset Os(A3) of the A3 event in Table 1 may be applied. Each of the offset On(A3) and the offset Os(A3) may be a positive value or a negative value. Further, in case that the offset is not applied, the values of the offset On(A3) and the offset Os(A3) may be set to zero.

TABLE 1

| Event | Operation and Threshold Value |
|---|---|
| A1 | When the absolute value of communication quality of the signal from the serving cell (source cell), to which the UE is connected, becomes greater than the threshold value Th(A1), a measurement report (MR) is transmitted to the connected base station. |
| A2 | When the absolute value of communication quality of the signal from the serving cell (source cell) becomes less than the threshold value Th(A2), a measurement report (MR) is transmitted to the connected base station. |
| A3 | When the sum of communication quality of the signal from an neighboring cell and the offset On(A3) becomes greater than the sum of communication quality of the signal from the |

TABLE 1-continued

| Event | Operation and Threshold Value |
|-------|-------------------------------|
|       | serving cell (source cell) and the offset Os(A3), a measurement report (MR) is transmitted to the connected base station. |
| A4    | When the absolute value of communication quality of the signal from a neighboring cell becomes greater than the threshold value Th(A4), a measurement report (MR) is transmitted to the connected base station. |
| A5    | When the absolute value of communication quality of the signal from the serving cell (source cell) becomes less than the threshold value Ths(A5) and the absolute value of communication quality of the signal from a neighboring cell becomes greater than the threshold value Thn(A5), a measurement report (MR) is transmitted to the connected base station. |

In FIG. 4, physical cell identifiers (PCI) different from each other are assigned to and set in the large zone cell 10A(F1), the terrestrial cell 30A(F1) and the terrestrial cell 30A(F2), respectively. In the illustrated example, PCI=100 is assigned to the large zone cell 10A(F1), PCI=101 is assigned to the terrestrial cell 30A(F1) of the same frequency F1, and PCI=201 is assigned to the terrestrial cell 30A(F2) of the different frequency F2.

When the UE 43 is connected (Attach) to the terrestrial-cell base station 30(F1) of the same frequency F1, an "RRC CONNECTION RECONFIGURATION" is transmitted from the terrestrial-cell base station 30(F1) to the UE 43 (S102 in FIG. 4). The "RRC CONNECTION RECONFIGURATION" includes setting information on the event and the threshold value. The setting information included in the "RRC CONNECTION RECONFIGURATION" may be setting information on any one of the plural kinds of events A1 to A5 and its threshold value, or may be setting information on plural events consisting of a part or all of the plural kinds of events A1 to A5 and those threshold values.

When the UE 43 connecting and locating in the terrestrial cell 30A(F1) moves to the cell boundary area (area at the right end in the figure), the UE 43 receives strong interference from the large zone cell 10A (F1). Under this situation, the UE 43 transmits a measurement report (MR) including information on the physical cell identifier (PCI) of the neighboring cell and the reception quality to the terrestrial-cell base station 30(F1) which are measured on the same frequency F1, for example, at the timing when the operation condition of any one of the events A1 to A5 is satisfied (S103 in FIG. 4). At this timing, since the reception quality S30(F1) of the signal received from the terrestrial-cell base station 30(F1) is larger than the predetermined threshold value Th0 of different-frequency-measurement start, the UE 43 does not start the measurement at the different frequency F2 (see FIG. 5).

Next, in case that the measurement report (MR) of the frequency F1 received from the UE 43 includes the physical cell identifier (PCI=100) of the large zone cell 10A(F1), the terrestrial-cell base station 30(F1) decides whether to change the threshold value Th0 of different-frequency-measurement start used for determining the different-frequency-measurement start that is set in the own station 30(F1) of the same frequency F1, based on the measured value of the level of reception quality (for example, RSRP or RSRQ) of the signal from the large zone cell 10A(F1) included in the measurement report (MR) (S104 in FIG. 4). For example, in case that the measurement report (MR) includes the physical cell identifier (PCI=100) of the large zone cell 10A(F1), and the measured value S10(F1) of the reception quality (for example, RSRP or RSRQ) of the signal from the large zone cell 10A(F1) included in the measurement report (MR) is larger than the predetermined threshold value Th0 of different-frequency-measurement start, which is initially set, the terrestrial-cell base station 30(F1) determines that the threshold value Th0 of different-frequency-measurement start is changed (see FIG. 5). Herein, it is noted that, even if the measured value of the reception quality (for example, RSRP or RSRQ) of the signal from the large zone cell 10A(F1) satisfies a predetermined handover condition, the terrestrial-cell base station 30(F1) does not transmit the HO command that requests the handover from the own station to the large zone cell 10A(F1), to the UE 43.

Next, when the terrestrial-cell base station 30(F1) determines that the threshold value Th0 of different-frequency-measurement start is to be changed in the step S104, the terrestrial-cell base station 30(F1) changes the predetermined threshold value Th0 of different-frequency-measurement start, which is set in the own station, for example, to a higher threshold value Th0' of different-frequency-measurement start so that the measurement of the different frequency is preferentially performed, and transmits a "RRC CONNECTION RECONFIGURATION" to the UE 43 (S105 in FIG. 4). The "RRC CONNECTION RECONFIGURATION" includes setting information on the changed threshold value Th0' of different-frequency-measurement start after changing.

When receiving the "RRC CONNECTION RECONFIGURATION" including the setting information on the changed threshold value Th0' of different-frequency-measurement start, the UE 43 overwrites and changes the predetermined threshold value Th0 of different-frequency-measurement start, which is held in the UE 43, to the changed threshold value Th0' of different-frequency-measurement start (S106 in FIG. 4), and transmits a "RRC CONNECTION RECONFIGURATION COMPLETE" including the information that the change is completed, to the terrestrial-cell base station 30(F1) (S107 in FIG. 4).

Next, when the reception quality S30(F1) of the signal received from the terrestrial-cell base station 30(F1) becomes smaller than the changed threshold value Th0' of different-frequency-measurement start (see FIG. 6), the UE 43 transmits a measurement report (MR) at the frequency F1 to the terrestrial-cell base station 30(F1) in order to start the measurement at the different frequency F2 (S108 in FIG. 4). The terrestrial-cell base station 30(F1) confirms that the reception quality S30(F1) of the own station included in the measurement report (MR) is smaller than the changed threshold value Th0' of different-frequency-measurement start, and transmits an "RRC CONNECTION RECONFIGURATION" instructing a measurement at the different frequency F2, to the UE 43 (S109 in FIG. 4). This "RRC CONNECTION RECONFIGURATION" includes setting information on each of the event and the threshold value for performing a handover control by the measurement at the different frequency F2. The UE 43 transmits an "RRC CONNECTION RECONFIGURATION COMPLETE" including the information on reception of the setting information of each of the event and the threshold value for performing a handover control by the measurement at the different frequency F2, to the terrestrial-cell base station 30(F1) (S110 in FIG. 4).

Next, the UE 43 starts the measurement at the different frequency F2, and transmits a measurement result (MR) for the handover between different frequencies based on the measurement result at the different frequency F2 to the terrestrial-cell base station 30(F1), by a predetermined event (for example, A3 event or A5 event) (S111 in FIG. 4). This measurement result (MR) includes the measurement result of the reception quality of the signal from the terrestrial-cell base station 30(F2) measured at the different frequency F2 and the cell identifier of the receiving target cell. The terrestrial-cell base station 30(F1) determines whether to perform the handover to the terrestrial cell 30A(F2) of the different frequency F2, based on the measurement result of the reception quality of the signal from the terrestrial-cell base station 30(F2) measured at the different frequency F2, which is included in the measurement report received from the UE 43. For example, in case that the measurement result S30(F2) of the reception quality from the terrestrial-cell base station 30(F2) of the different frequency F2 is larger than the sum of the measurement result S30(F1) of the reception quality from the terrestrial-cell base station 30(F1) and the predetermined offset (see FIG. 7), the terrestrial-cell base station 30(F1) determines the handover from the own station to the terrestrial cell 30A(F2) of the frequency F2.

When the terrestrial-cell base station 30(F1) determines the handover from the own station to the terrestrial cell 30A(F2) of the frequency F2, the terrestrial-cell base station 30(F1) transmits an "RRC RECONFIGURATION" including the HO command that requests the handover from the own station to the terrestrial cell 30A(F2) of the frequency F2, to the UE 43 (S112 in FIG. 4).

When receiving the "RRC RECONFIGURATION" including the HO command that requests the handover from the terrestrial-cell base station 30(F1) to the terrestrial cell 30A(F2) of the frequency F2, the UE 43 transmits an "RRC CONNECTION RECONFIGURATION COMPLETE" including the information on reception of the HO command, to the terrestrial-cell base station 30(F2) of the target cell of the handover destination (S113 in FIG. 4).

When receiving the "RRC CONNECTION RECONFIGURATION COMPLETE" from the UE 43, the terrestrial-cell base station 30(F2) of the target cell transmits "RRC CONNECTION RECONFIGURATION" for starting the handover process to the own station 30(F2) of the different frequency F2, to the UE 43 (S114 in FIG. 4), and receives the response "RRC CONNECTION RECONFIGURATION COMPLETE" from the UE 43 (S115 in FIG. 4). As a result, a process for subsequent handover is performed between the terrestrial-cell base station 30(F2) and the UE 43.

Figure 8:
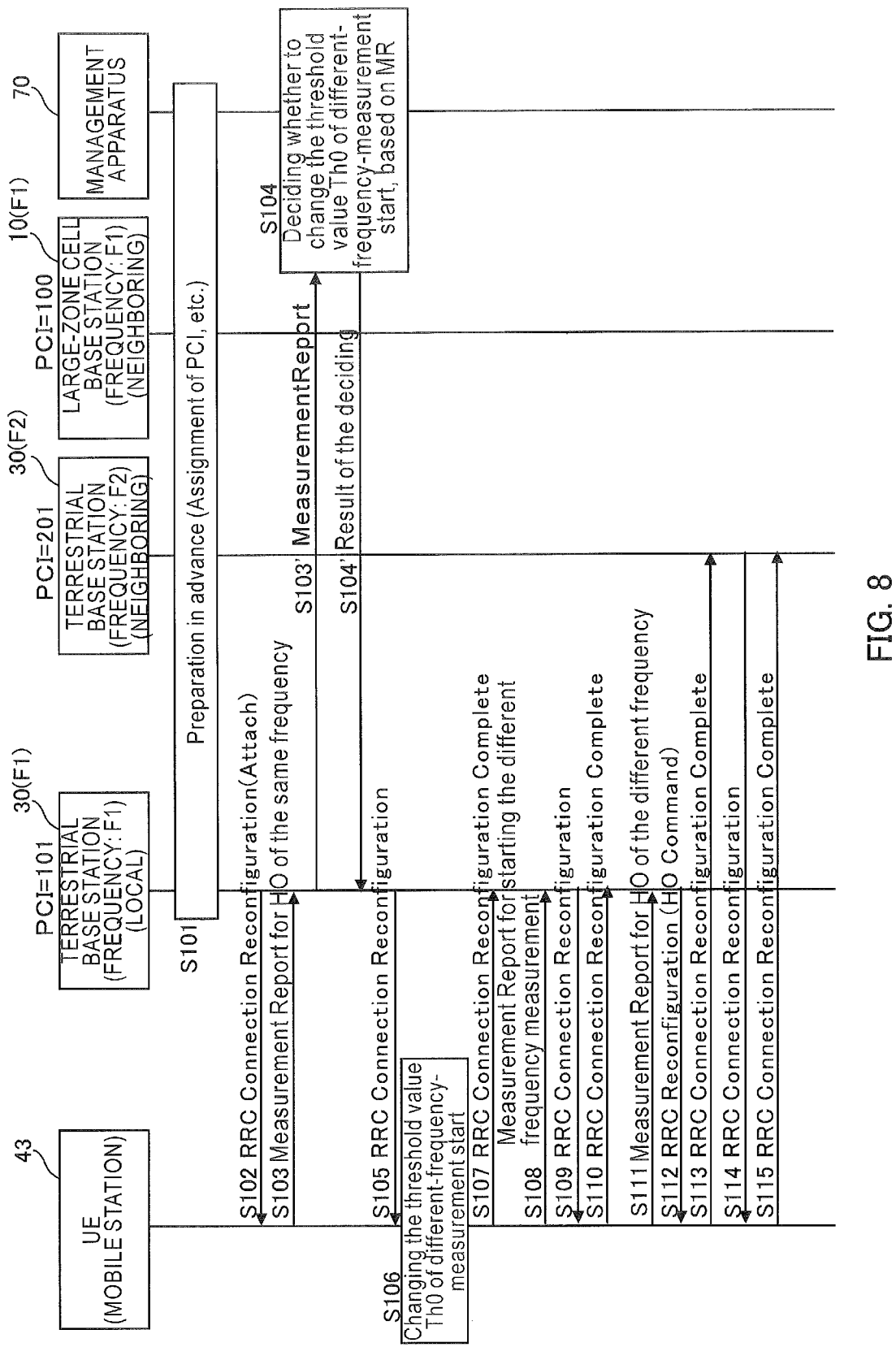
FIG. 8 is a sequence diagram showing another example of handover control between different frequencies in an overlay cell configuration of a mobile communication system according to the present embodiment.

FIG. 8 is a sequence diagram showing another example of handover control between difference frequencies in the overlay cell configuration of the mobile communication system according to the present embodiment. In the example of FIG. 8, a management apparatus 70, which remotely and centrally manages the large-zone cell base station 10 and the terrestrial-cell base station 30, determines whether to change the threshold value Th0 of different-frequency-measurement start as a parameter for determination, instead of the terrestrial-cell base station 30(F1). In this example, the load on the terrestrial-cell base station 30(F1) can be reduced. The threshold value Th0 of different-frequency-measurement start can be appropriately changed in consideration of the distribution of the terrestrial-cell base station 30(F2) of the different frequency F2, the tightness of the capacity of the communication traffic in the large zone cell 10A, and the like. Since steps S101 to S103 and S105 to S115 in FIG. 8 are the same as those in FIG. 4 described above, those descriptions are omitted.

In FIG. 8, the terrestrial-cell base station 30(F1) transmits the measurement report (MR) of the frequency F1 received from the UE 43, to the management apparatus 70 (S103' in FIG. 8). In case that the measurement report (MR) of the frequency F1 received from the terrestrial-cell base station 30(F1) includes the physical cell identifier (PCI=100) of the large zone cell 10A(F1), the management apparatus 70 determines whether to change the threshold value Th0 of different-frequency-measurement start used for determining the different-frequency-measurement start, which is set in the own station 30(F1) of the same frequency F1, based on the measured value of the reception quality (for example, RSRP or RSRQ) of the signal from the large zone cell 10A(F1) included in the measurement report (MR) (S104 in FIG. 8). For example, in case that the measurement report (MR) includes the physical cell identifier (PCI=100) of the large zone cell 10A(F1), and the measured value S10(F1) of the reception quality (for example, RSRP or RSRQ) of the signal from the large zone cell 10A(F1) included in the measurement report (MR) is larger than the predetermined threshold value Th0 of different-frequency-measurement start, which is initially set, the management apparatus 70 determines that the threshold value Th0 of different-frequency-measurement start is changed (see FIG. 5 described above). Herein, it is noted that, even if the measured value of the reception quality (for example, RSRP or RSRQ) of the signal from the large zone cell 10A(F1) satisfies a predetermined handover condition, the management apparatus 70 does not transmit the HO command that requests the handover from the own station to the large zone cell 10A(F1), to the UE 43.

Next, when the management apparatus 70 determines that the threshold value Th0 of different-frequency-measurement start is to be changed in the step S104, the management apparatus 70 transmits the determination result to the terrestrial-cell base station 30(F1), and changes the setting of the predetermined threshold value Th0 of different-frequency-measurement start, which is set in the terrestrial-cell base station 30(F1) to the threshold value Th0' of different-frequency-measurement start, which is higher than the reception level from the large zone cell 10A(F1) included in the measurement report (MR) reported by the UE, so that the measurement of the different frequency is preferentially performed, for example. Further, for example, the setting of the predetermined threshold value Th0 of different-frequency-measurement start, which is set in the terrestrial-cell base station 30(F1), may be changed to the threshold value Th0' of different-frequency-measurement start, which is lower than the reception level from the large zone cell 10A(F1) included in the measurement report (MR) reported by the UE, so that the measurement of the different frequency is not preferentially performed.

According to the present embodiment, in the overlay cell configuration in which plural terrestrial cells 30A(F1) and 30A(F2) having a small cell size are located in the large zone cell 10A(F1), in case that the reception level of the terrestrial cell 30A(F1) of the same frequency F1 is lower than that of the large zone cell 10A(F1), by preferentially performing a handover of the UE 43, which is connected to the terrestrial-cell base station 30(F1) that uses the same frequency F1 as the large zone cell 10A(F1) in the downlink of the service link, to the terrestrial-cell base station 30(F2) of the different frequency F2, it is possible to prevent a concentration of communication traffic on the large zone cell 10A(F1).

In the foregoing embodiment, after changing the parameter for determination (threshold value Th0 of different-frequency-measurement start, reception-quality offset Offset0, or both of them) used for determining the different-frequency-measurement start, the terrestrial-cell base station 30(F1) may transmit the HO command that requests a handover from the own station to the large zone cell 10A (F1), to the UE 43, when receiving a predetermined number of measurement reports (MR) including the cell identifier (PCI) of the large zone cell 10A(F1) from the UE 43 connected to the own station.

In the foregoing embodiment, the terrestrial-cell base station 30(F1) may transmit the HO command that requests a handover from the own station to the large zone cell 10A(F1), to the UE 43, when receiving a predetermined number of measurement report (MR) including the cell identifier (PCI) of the large zone cell 10A(F1) within a predetermined period of time.

In the foregoing embodiment, the changed value of the parameter for determination (threshold value Th0' of different-frequency-measurement start, reception-quality offset Offset0', or both) may be notified to some or all of the UEs 43 that have transmitted the measurement report (MR) including the cell identifier (PCI) of the large zone cell 10A(F1), among plural UEs 43 connected to the terrestrial-cell base station 30(F1). Herein, the value of the parameter for determination (threshold value Th0' of different-frequency-measurement start, reception-quality offset Offset0', or both) notified to the plural UEs 43 may be the same value each other between the UEs 43, or may be the values different from each other between the UEs 43.

In the foregoing embodiment, the value of the parameter for determination (threshold value Th0 of different-frequency-measurement start, reception-quality offset Offset0, or both) is changed so as to advance the timing of different-frequency-measurement start when priority is given to connection to the terrestrial cell 30A(F2) of the different frequency F2 as in the above-mentioned examples of FIG. 4 to FIG. 8. For example, the value of the threshold value Th0 of different-frequency-measurement start may be changed to a value higher than the reception level from the large zone cell included in the measurement report (MR) reported from the UE.

On the contrary, when priority is given to connection to the large zone cell 10A(F1), the value of the parameter for determination may be changed so as to delay the timing of different-frequency-measurement start. For example, the value of the threshold value Th0 of different-frequency-measurement start may be changed to a value lower than the reception level from the large zone cell included in the measurement report (MR) reported from the UE.

In the foregoing embodiment, the value of the parameter for determination (threshold value Th0 of different-frequency-measurement start, reception-quality offset Offset0, or both) may be dynamically changed based on the frequency resource availability of the terrestrial-cell base station 30(F2) of the different frequency F2 around the terrestrial-cell base station 30(F1) of the same frequency F1. For example, in case that the communication traffic volume of the terrestrial-cell base station 30(F2) of the different frequency F2 around the terrestrial-cell base station 30(F1) of the same frequency F1 is small and frequency resources are available (for example, in case that there is a vacancy in the frequency resource, or in case that the vacancy in the frequency resource is equal to or higher than a predetermined threshold value), the threshold value Th0 of different-frequency-measurement start may be increased to facilitate a handover to the terrestrial-cell base station 30(F2) of the different frequency F2. In case that the communication traffic volume of the terrestrial-cell base station 30(F2) of the different frequency F2 increases and there is no spare frequency resource (for example, in case that there is no free space in the frequency resource, or in case that the free space in the frequency resource is less than the predetermined threshold value), the threshold value Th0 of different-frequency-measurement start may be decreased so that a handover to the terrestrial-cell base station 30(F2) of the different frequency F2 is difficult to be performed.

In the foregoing embodiment, the threshold value Th0 of different-frequency-measurement start or the reception-quality offset Offset0 may be dynamically changed based on the change in the load status of the communication capacity (communication traffic volume) of the large zone cell 10A (F1).

For example, in the foregoing embodiment, in case that the communication traffic volume of the large zone cell 10A is large (for example, in case that the communication traffic volume is equal to or greater than a predetermined traffic threshold value Tht), the threshold value Th0 of different-frequency-measurement start may be increased to facilitate a handover to the terrestrial-cell base station 30(F2) of the different frequency F2. In case that the communication traffic volume of the large zone cell 10A is small (for example, in case that the communication traffic volume is less than the predetermined traffic threshold value Tht), the threshold value Th0 of different-frequency-measurement start may be decreased so that a handover to the terrestrial-cell base station 30(F2) of the different frequency F2 is difficult to be performed.

In the foregoing embodiment, although the case of changing the value of the threshold value Th0 of different-frequency-measurement start as a parameter for determination has been mainly described, the value of the reception-quality offset Offset0 that is added to or subtracted from the measured value of the reception-quality level of the signal from the large zone cell 10A may be changed, or both the threshold value Th0 of different-frequency-measurement start and the reception-quality offset Offset0 may be changed, as parameters for determination.

In the foregoing embodiment, for the area where the connection to the large zone cell 10A(F1) is to be prioritized, even if the above-mentioned change conditions are satisfied, the parameter for determination (threshold value Th0 of different-frequency-measurement start, reception-quality offset Offset0, or both) may not be changed.

In the foregoing embodiment, although the case of the overlay cell configuration of the terrestrial cell (small cell 20A, macro cell 30A) and the large zone cell 10A has been described, the present invention is not limited to this configuration and can be applied to an overlay cell configuration of plural cells with sizes different from each other.

In the present embodiment, although it was explained on the premise of application to the LTE/LTE-Advanced, the concept of the present invention can be applied to any system as long as it uses a downlink radio communication similar to the LTE/LTE-Advanced, and is not limited to the configurations of the transmitter and receiver shown in the present embodiment.

The process steps and configuration elements of the mobile communication system, the management apparatus, the large-zone cell base station, the terrestrial-cell base station (small-cell base station, macro-cell base station) and the mobile station (user apparatus, terminal apparatus, user terminal apparatus) described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various radio communication apparatuses, wired or wireless network communication apparatus, Node B, BBU, RRH, terminal, communication module, hard disk drive apparatus, or optical disk drive apparatus) may be implemented in one or more of an application-specific IC (ASIC), a digital signal processor (DSP), a digital signal processing device (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 large-zone cell base station
10(F1) large-zone cell base station of the frequency F1

10A large zone cell
10A(F1) large zone cell of the frequency F1
15 communication relay apparatus
20 terrestrial-cell base station
20A terrestrial cell (small cell)
30, 31 terrestrial-cell base station
30(F1), 31(F1) terrestrial-cell base station of the same frequency F1 (second base station)
30(F2), 31(F2) terrestrial-cell base station of the different frequency F2 (third base station)
30(F1, F2), 31(F1, F2) terrestrial-cell base station shared for frequencies F1 and F2
30A, 31A terrestrial cell (macro cell)
30A(F1), 31A(F1) terrestrial cell of the same frequency F1 (macro cell)
30A(F2), 31A(F2) terrestrial cell of the different frequency F2 (macro cell)
41 UE connected to the large zone cell (first cell)
42 UE connected to the terrestrial cell (small cell)
43 UE connected to the terrestrial cell (macro cell)

The invention claimed is:

1. A communication system of an overlay cell configuration, comprising one or more first base stations for forming one or more first cells, one or more second base stations for forming a second cell of a same frequency using a same downlink frequency as the first cell, and one or more third base stations for forming a third cell of a different frequency using a downlink frequency different from that of the first cell, the first cell, the second cell and the third cell overlapping with each other at least partially, the communication system comprising:

means for deciding whether to change a value of a parameter for determination used for determining a different-frequency-measurement start, when a cell identifier of the first cell is included in a measurement report (MR) that is reported by a mobile station connected to the second cell of the same frequency and includes a measurement result of a reception-quality level measured at the same frequency and a cell identifier of a receiving target cell, based on a measured value of a reception-quality level of a signal from the first cell included in the measurement report (MR); and means for changing a value of the parameter for determination based on a result of the deciding.

2. The communication system according to claim 1, wherein, when the measurement result of the reception-quality level from the first base station reported in the measurement report (MR) from the mobile station is larger than a threshold value of different-frequency-measurement start of the second cell under connecting to which the mobile station is connected, a determination to change the value of the parameter for determination is performed.

3. The communication system according to claim 1, wherein the parameter for determination is a threshold value of different-frequency-measurement start that is compared with the measured value of the reception-quality level of the signal from the first cell, a reception-quality offset that is added to or subtracted from the measured value of the reception-quality level of the signal from the first cell, or both.

4. The communication system according to claim 1, wherein the second base station of the same frequency comprising:

means for receiving the measurement report (MR) including the measurement result of the reception-quality level measured at the same frequency and the cell identifier of the receiving target cell, from a mobile station connected to the own second base station;

means for deciding whether to change a value of a parameter for determination used for determining a different-frequency-measurement start, the value of the parameter for determination being set in the own second base station, when the measurement report (MR) includes the cell identifier of the first cell, based on the measured value of the reception-quality level of the signal from the first cell included in the measurement report (MR);

means for changing the value of the parameter for determination based on a result of the deciding; and means for notifying the changed value of the parameter for determination, to the mobile station connected to the own second base station.

5. The communication system according to claim 4, wherein the second base station of the same frequency performs a determination to change the value of the parameter for determination, in case that the measurement result of the reception-quality level from the first base station, the measurement result being reported in the measurement report (MR) from the mobile station, is larger than a threshold value of different-frequency-measurement start of the second cell under connecting to which the mobile station is connected.

6. The communication system according to claim 4, wherein the second base station of the same frequency comprising:

means for transmitting a command that requests a handover from the second cell of the own second base station to the first cell, to the mobile station, when the measurement report (MR) including the cell identifier of the first cell is received a predetermined number of times from the mobile station connected to the own second base station, after changing the value of the parameter for determination.

7. The communication system according to claim 6, wherein the second base station of the same frequency transmits the command that requests the handover from the second cell of the own station to the first cell to the mobile station, when the measurement report (MR) including the cell identifier of the first cell is received a predetermined number of times within a predetermined period of time.

8. The communication system according to claim 4, wherein the communication system notifies the changed value of the parameter for determination to a part or all of the mobile stations from which the measurement reports (MR) including the cell identifier of the first cell are transmitted and for which the threshold values of different-frequency-measurement start are determined, among the plural mobile stations connected to the second cell of the same frequency.

9. The communication system according to claim 1, comprising a management apparatus for managing the second base station, wherein the management apparatus comprising:

means for obtaining the measurement report (MR) including the measurement result of the reception-quality level measured at the same frequency and the cell identifier of the receiving target cell, the measurement report (MR) being reported by the mobile station connected to the second cell of the same frequency;

means for deciding whether to change the value of the parameter for determination used for determining the different-frequency-measurement start, the value of the parameter for determination being set in the second base station of the same frequency, based on the measured value of the reception-quality level of the signal from the first cell, the measured value being included in the measurement report (MR), when the measurement report (MR) includes the cell identifier of the first cell;

means for changing the value of the parameter for determination based on a result of the deciding; and means for setting the changed value of the parameter for determination in the second base station of the same frequency as notification information to be notified to the mobile station connected to the second cell of the same frequency.

10. The communication system according to claim 9, wherein the communication system notifies the changed value of the parameter for determination to a part or all of the mobile stations from which the measurement reports (MR) including the cell identifier of the first cell are transmitted and for which the threshold values of different-frequency-measurement start are determined, among the plural mobile stations connected to the second cell of the same frequency.

11. The communication system according to claim 1, wherein the communication system advances a timing of different-frequency-measurement start by increasing a threshold value of different-frequency-measurement start.

12. The communication system according to claim 1, wherein the communication system changes the value of the parameter for determination so as to delay a timing of different-frequency-measurement start, by decreasing a threshold value of different-frequency-measurement start.

13. The communication system according to claim 1, wherein the communication system dynamically changes the value of the parameter for determination based on an availability of frequency resources.

14. The communication system according to claim 1, wherein the communication system dynamically changes the value of the parameter for determination based on a change in load status of a communication capacity of the first base station forming the first cell.

15. The communication system according to claim 1, wherein the communication system does not change the value of the parameter for determination for an area in which a connection to the first cell is desired to be prioritized.

16. A base station forming a second cell in an overlay cell configuration in which one or more first cells, one or more second cells of a same frequency using a same downlink frequency as the first cell, and one or more third cells of a different frequency using a downlink frequency different from that of the first cell are overlapped with each other at least partially, the base station forming the second cell comprising:

means for receiving a measurement report (MR) including a measurement result of a reception-quality level measured at the same frequency and a cell identifier of a receiving target cell from a mobile station connected to the own base station;

means for deciding whether to change a value of a parameter for determination used for determining a different-frequency-measurement start, the value of the parameter for determination being set in the own base station, based on the measured value of the reception-quality level of the signal from the first cell included in the measurement report (MR), when the measurement report (MR) includes the cell identifier of the first cell;

means for changing the value of the parameter for determination based on a result of the deciding; and means for notifying the changed value of the parameter for determination after changing, to the mobile station connected to the own base station.

17. A management apparatus for managing base stations in an overlay cell configuration in which one or more first cells, one or more second cells of a same frequency using a same downlink frequency as the first cell, and one or more third cells of a different frequency using a downlink frequency different from that of the first cell are overlapped with each other at least partially, the management apparatus comprising:

means for obtaining a measurement report (MR) including a measurement result of a reception-quality level measured at the same frequency and a cell identifier of a receiving target cell, the measurement report (MR) being reported by a mobile station connected to the second cell of the same frequency;

means for deciding whether to change a value of a parameter for determination used for determining a different-frequency-measurement start, the value of the parameter for determination being set in a second base station forming the second cell of the same frequency, based on the measured value of the reception-quality level of the signal from the first cell, the measured value being included in the measurement report (MR), when the measurement report (MR) includes the cell identifier of the first cell;

means for changing the value of the parameter for determination based on a result of the deciding; and means for setting the changed value of the parameter for determination in the second base station of the same frequency as notification information to be notified to the mobile station connected to the second cell of the same frequency.

18. A handover control method for controlling a handover of a mobile station in an overlay cell configuration in which one or more first cells, one or more second cells of a same frequency using a same downlink frequency as the first cell, and one or more third cells of a different frequency using a downlink frequency different from that of the first cell are overlapped with each other at least partially, the handover control method comprising:

obtaining a measurement report (MR) including a measurement result of a reception-quality level measured at the same frequency and a cell identifier of a receiving target cell, the measurement report (MR) being reported by a mobile station connected to the second cell of the same frequency;

deciding whether to change a value of a parameter for determination used for determining a different-frequency-measurement start, based on the measured value of the reception-quality level of the signal from the first cell, the measured value being included in the measurement report (MR), when the measurement report (MR) includes the cell identifier of the first cell; and

28 changing the value of the parameter for determination based on a result of the deciding.

19. A non-transitory computer readable storage medium containing software that is executed by a computer or processor provided in a base station forming a second cell, in an overlay cell configuration in which one or more first cells, one or more second cells of a same frequency using a same downlink frequency as the first cell, and one or more third cells of a different frequency using a downlink frequency different from that of the first cell are overlapped with each other at least partially, the software comprising:

executable code that receives a measurement report (MR) including a measurement result of a reception-quality level measured at the same frequency and a cell identifier of a receiving target cell from a mobile station connected to the own base station;

executable code that decides whether to change a value of a parameter for determination used for determining a different-frequency-measurement start, the value of the parameter for determination being set in the own base station, based on a measured value of a reception-quality level of a signal from the first cell, the measured value being included in the measurement report (MR), when the measurement report (MR) includes the cell identifier of the first cell;

executable code that changes the value of the parameter for determination based on a result of the deciding; and executable code that notifies the changed value of the parameter for determination after changing, to the mobile station connected to the own base station.

20. A non-transitory computer readable storage medium containing software that is executed by a computer or processor provided in a management apparatus for managing base stations in an overlay cell configuration in which one or more first cells, one or more second cells of a same frequency using a same downlink frequency as the first cell, and one or more third cells of a different frequency using a downlink frequency different from that of the first cell are overlapped with each other at least partially, the software comprising:

executable code that obtains a measurement report (MR) including a measurement result of a reception-quality level measured at the same frequency and a cell identifier of a receiving target cell, the measurement report (MR) being reported by a mobile station connected to the second cell of the same frequency;

executable code that decides whether to change a value of a parameter for determination used for determining a different-frequency-measurement start, the value of the parameter for determination being set in a second base station forming the second cell of the same frequency, based on the measured value of the reception-quality level of the signal from the first cell, the measured value being included in the measurement report (MR), when the measurement report (MR) includes the cell identifier of the first cell;

executable code that changes the value of the parameter for determination based on a result of the deciding; and executable code that sets the changed value of the parameter for determination in the second base station of the same frequency as notification information to be notified to the mobile station connected to the second cell of the same frequency.

* * * * *